United States Patent
Freathy

(10) Patent No.: US 11,468,752 B2
(45) Date of Patent: Oct. 11, 2022

(54) PERSONAL MONITORING DEVICE WITH MULTI-FILAMENT TAMPER STRAP

(71) Applicant: SATELLITE TRACKING OF PEOPLE LLC, Houston, TX (US)

(72) Inventor: Stephen Freathy, Pinehurst, TX (US)

(73) Assignee: SATELLITE TRACKING OF PEOPLE LLC, Houston, TX (US)

( * ) Notice: Subject to any disclaimer, the term of this patent is extended or adjusted under 35 U.S.C. 154(b) by 3 days.

(21) Appl. No.: 17/127,118

(22) Filed: Dec. 18, 2020

(65) Prior Publication Data

US 2021/0287502 A1 Sep. 16, 2021

Related U.S. Application Data

(63) Continuation-in-part of application No. 16/815,799, filed on Mar. 11, 2020, now Pat. No. 10,909,840.

(51) Int. Cl.
| | |
|---|---|
| *G08B 29/00* | (2006.01) |
| *G08B 13/186* | (2006.01) |
| *G08B 21/22* | (2006.01) |
| *H04W 4/02* | (2018.01) |

(52) U.S. Cl.
CPC ........... *G08B 13/186* (2013.01); *G08B 21/22* (2013.01); *H04W 4/02* (2013.01)

(58) Field of Classification Search
CPC .. G08B 13/186; G08B 21/22; G08B 21/0288; G08B 21/0286; G08B 21/0261; G08B 21/12; G08B 29/046; H04W 4/02; H04W 4/80; Y10S 200/36; E05B 45/005
See application file for complete search history.

(56) References Cited

U.S. PATENT DOCUMENTS

| | | | | |
|---|---|---|---|---|
| 5,627,520 | A * | 5/1997 | Grubbs | G07C 9/28 455/100 |
| 5,650,766 | A * | 7/1997 | Burgmann | G08B 21/22 340/568.1 |
| 8,831,627 | B2 * | 9/2014 | Aninye | B60R 25/1018 340/539.11 |

* cited by examiner

*Primary Examiner* — Toan N Pham
(74) *Attorney, Agent, or Firm* — Polsinelli PC

(57) ABSTRACT

A clip is provided. The clip includes first and second shells shaped to mate around a band. An inward facing surface of the first shell has a lateral groove shaped to accommodate the fiber optic filament of the band and at least one protrusion. When the first and second shells are mated around the band the at least one protrusion passes through one of the holes in the band and engages a matching groove in an inward facing surface of the second shell. The first and second shells have a shape such that, when the first shell and the second shell mate around the band and lock into the connector, the first shell and the second shell collectively block any exterior light from reaching the light detection circuitry of the connector along the path of the band other than light through the fiber optic filament.

20 Claims, 16 Drawing Sheets

606

608

PERSONAL MONITORING DEVICE WITH MULTI-FILAMENT TAMPER STRAP

CROSS-REFERENCE TO RELATED APPLICATIONS

This application is a Continuation-in-Part of U.S. application Ser. No. 16/815,799, filed on Mar. 11, 2020 entitled "PERSONAL MONITORING DEVICE WITH MULTI-FILAMENT TAMPER STRAP", all of which are incorporated herein in its entirety.

FIELD OF THE INVENTION

Various embodiments described herein relate generally to a tamper detection in a tracking device. More particularly, various embodiments herein relate to the optics within the strap and end connections to identify different types of tamper events.

BACKGROUND

The monitoring of movements of monitored individuals involves a variety of sectors, including parolees and home confinement. The technology has its roots in the home arrest systems of the 1980's, in which a user wearable component—typically a "beacon" anklet that was locked to the monitored individual—would communicate wirelessly with a stationary base unit. The range was limited to a few feet of the radio frequency transmitter and receiver. The base unit included a telephone connection for communicating with the authorities. If the monitored individual left the short range allowed by the equipment, the tag and the base unit would lose contact and the base unit would respond by sending an alert to the authorities. False alarms for minor deviations from the short range and/or an inability to confirm false from actual alarms (if the person was where they were supposed to be when the police arrived to investigate) desensitized the police to such alerts, rendering the technology of limited application to low risk offenders. Also those designs had limited tamper detection capability if the band was severed.

A later generation of the technology incorporated GPS and cellular telephone technology in a locked anklet. The device would actively record the location of the monitored individual over time and transmit the data to a central monitoring location (e.g., police or parole monitoring services). The central location could store and analyze the data for prohibited movements (e.g., a sex offender near a school) or cross reference the movement data with crime incident data to see if the monitored individual was near the crime at the time of the crime. U.S. Pat. Nos. 5,867,103, 6,160,481, 6,218,945, 6,512,456 and 6,703,936, incorporated herein by reference in their entireties, are each exemplary of such a system. The technology is also used to monitor other individual sectors (e.g., patients, children) and objects (e.g., cars, cargo).

The modern monitoring device includes a GPS receiver that determines location, a memory that stores location data over time to define a movement history, and a cellular modem that communicates the movement history to a central location through the cell network. A common implementation is in the criminal justice system as an alternative to incarceration, and monitored individuals (typically parolees) have tamper resistant devices attached to their leg by a band. For ease of discussion embodiments herein are directed to parolees, although the invention is not so limited.

Often a condition of parole is that a parolee wears a personal monitoring device, and removal of the monitoring device (e.g., cutting the band that attaches it to the leg, known as "cut and run") is a parole violation that could result in revocation of the parole and subsequent re-incarceration. In some jurisdictions the removal of the monitoring device in and of itself is an independent crime and can result in additional charges and/or jail time.

Prior art monitoring devices use one or more optical pathways defined in part by an optical filament, such as a fiber optical cable, embedded in the strap. The housing of the monitoring device includes a light source and a light receiver. When the strap is connected, one end of the cable is positioned to receive light from the light source and the other end is connected to a funnel that funnels light emerging from the optical filament into the light receiver. Based on internal programming, the light transmitter will be in either an ON or OFF state, the quantity and type of light (e.g., frequency, color) received should be consistent with the expected amount of light from the transmitter, i.e., no light when the transmitter is OFF and some amount of light (consistent with strength of the light source) when the transmitter is ON. Receipt of the expected light is consistent with proper attachment of the monitored device to the user.

A variety of circumstances, both intentional and accidental, can cause the system to not receive the expected light. One circumstance is if the band is completely cut off, in which case the light from the light source will not reach the light receiver when expected because the pathways have been severed; this example represents a highest state of concern for the monitoring authority as may be coincident with the monitored person preparing to either flee or engage in further criminal behavior. Another circumstance is if dust or debris entered into the monitored device and blocks the optical pathway, in which case the light from the light source will not reach the light receiver when expected; this example represents a low state of concern for the monitoring authority as it is simply a device maintenance issue without any meaningful threat from the monitored person.

Despite the different circumstances and the concern levels they raise, both circumstances trigger the same physical problem—a binary situation in that the expected light is or is not received. Since this binary situation covers all states of concern, the system must react as if a worst case threat level of intentional cutting of the band regardless of whether this is in fact the case. Immediate supervisory authority (e.g., police) response to high level alert of a potential cut and run that eventually proves to be nothing more than a maintenance issue can desensitize authorities to the high level alert.

BRIEF DESCRIPTION OF THE DRAWINGS

Various embodiments in accordance with the present disclosure will be described with reference to the drawings, in which.

DETAILED DESCRIPTION

Figure 1:
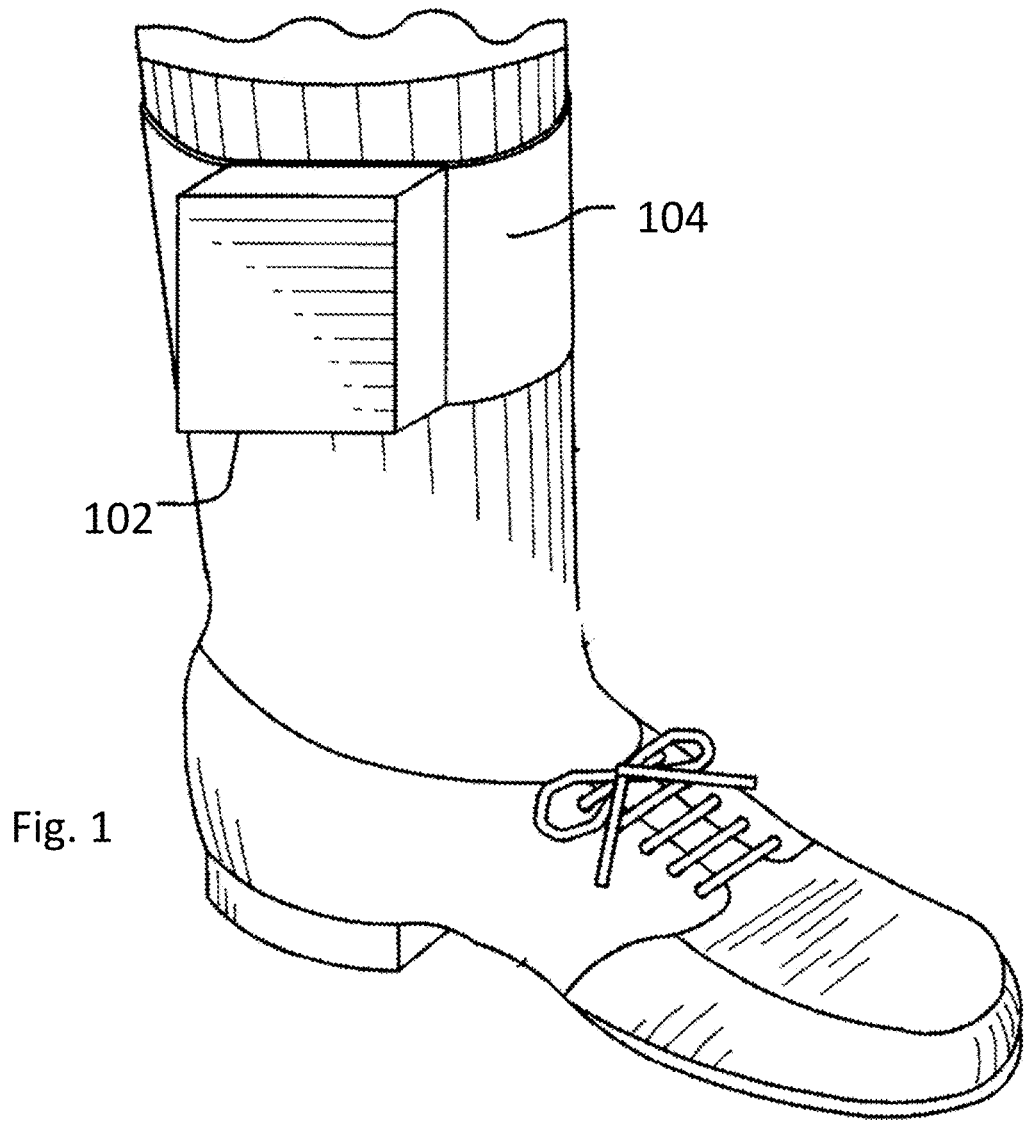
FIG. 1 illustrates an embodiment of a monitoring device attached to an ankle of a user.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. An individual skilled in the relevant art will recognize that other components and configurations may be used without departing from the scope and spirit of the claimed subject matter.

Several definitions that apply throughout this disclosure will now be presented. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized, means "including, but not necessarily limited to"; it specifically indicates open-ended inclusion or membership in the so-described combination, group, series and the like. The term "a" means "one or more" absent express indication that it is limited to the singular. "First," "second," etc. are labels to differentiate like terms from each other, and does not imply any order or numerical limitation.

The phrase "monitored population" refers to a group of individuals and/or objects that have issued monitoring devices and are subject to common electronic location monitoring by an oversight system. The phrase "monitored individual" refers to a particular individual in the monitored population.

The phrase "unmonitored individual" refers to a particular individual that is not within a particular monitored population. An unmonitored individual may be under no monitoring at all, or may be a monitored individual within a different monitored population. By way of non-limiting example, jurisdictions often run their own monitoring programs based on equipment from competitors that do not share information with each other. Thus, California may have an oversight system and corresponding monitored population for California residents, while Texas may have its own oversight system and corresponding monitored population for Texas residents. If the systems are not compatible or otherwise are not sharing data, then they are two different monitored populations. A monitored individual within California's system would thus be a monitored individual within the California monitored population, but an unmonitored individual within Texas' system because Texas is not monitoring that particular individual.

The phrase "general population" refers to people generally, and may include monitored and unmonitored individuals.

An "authorized individual" or "supervising authority" would be any one or more people having some type of supervisory responsibility and/or decision making relative to the monitored population or monitored individual therein. By way of non-limiting example, a parole officer would be the authorized individual relative to a parolee. Other non-limiting examples include parent/child, patient/medical supervisor, etc. Security and/or police could be considered a supervising authority relative to a population of monitored individuals to the extent the emergency level intervention is necessary. For sake of brevity, discussion herein is confined to parolee/parole officer relationship, although the invention is not so limited. The invention also applies to objects that can be monitored, such as cars or cargo.

In the concept of devices, a "mobile" device refers to wireless devices with wireless connectively that are designed to be routinely carried by individuals without access to utility power; non-limiting examples include cellular phones, tablets, PDAs and laptops. A common feature of a mobile device is an internal battery that allows for extended periods of use while away from utility electrical power. A "stationary" device refers to devices that are designed to be located for extended periods of time in a single location while operating on utility power; non-limiting examples include desktop PC's, servers and routers. A common feature of a stationary device is either the lack of an internal battery with corresponding full reliance on utility electrical power, or the presence of a battery (internal or external) for limited backup purposes in the case of loss of utility power. Mobile devices may at times be used as stationary devices (e.g., a laptop may be connected to utility power for an extended period of time and used at a single location), and stationary devices may at times act as mobile devices (in that at least any device can be relocated and at least for a brief period be run on backup power), but this does not change their classification as mobile or stationary.

In the concept of technologically determining a geographic position of a person or object, the term "location" refers to the position that the technology identifies the person or object to be, as opposed to the actual physical location of the person or object. All such tracking technologies have some degree of margin of error such that any technologically determined location will not be an exact location of the person or object. For example, under certain conditions GPS has a known margin of error within 1-5 meters, and thus the location determined for a person using GPS under those conditions may differ from their actual position by 1-5 meters. Any such technological determinations of position are thus approximate based on the underlying accuracy of the tracking technology and margin of error. Any use of "location" in the specification or claims is to be considered modified by "approximate" to account for such variation whether expressly stated or not.

"Fugitive" refers to a monitored person who has disabled their monitoring device, such as by cutting the band.

FIG. 1 shows a block diagram of a monitoring device 102 according to an embodiment of the invention. Monitoring device 102 can determine its location, such as through the Global Positioning Satellite, cell towers, LORAN, wireless local access points, or other known methodologies; for sake of brevity discussion herein is confined to GPS, although the invention is not so limited. Monitoring device 102 is shown as a one-piece unit, although multiple pieces as known in the art could also be used.

A band 104 secures the monitoring device 102 to a limb of the user, typically the ankle, via a locking mechanism that creates a lock via either a permanent connection (into perpetuity absent application of destructive force) or a removable connection in that it can only be (legally) unlocked by an authorized individual with an appropriate key or tool. A basic ankle mounting is shown in FIG. 1, although the invention is not limited thereto. Monitoring device 102 includes a band 104, and preferably has tamper detection capabilities as set forth herein, as well other capabilities as is known in the art and not discussed further herein.

Figure 2:
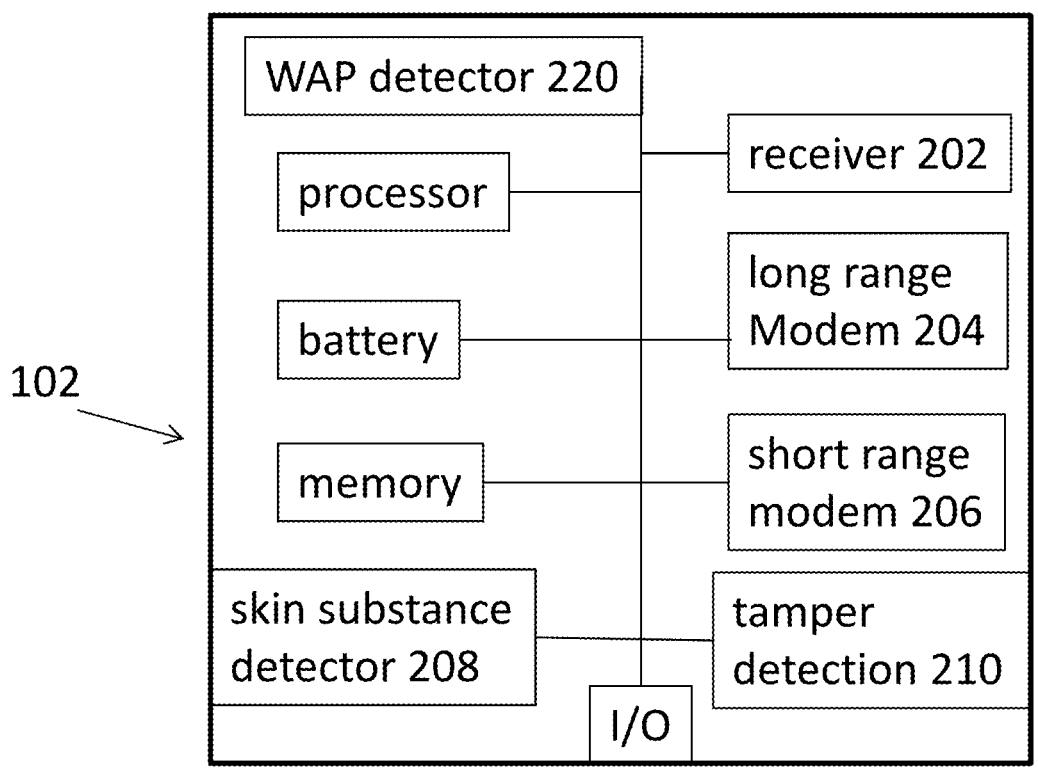
FIG. 2 illustrates an embodiment of the internal components of the monitoring device of FIG. 1.
Figure 3:
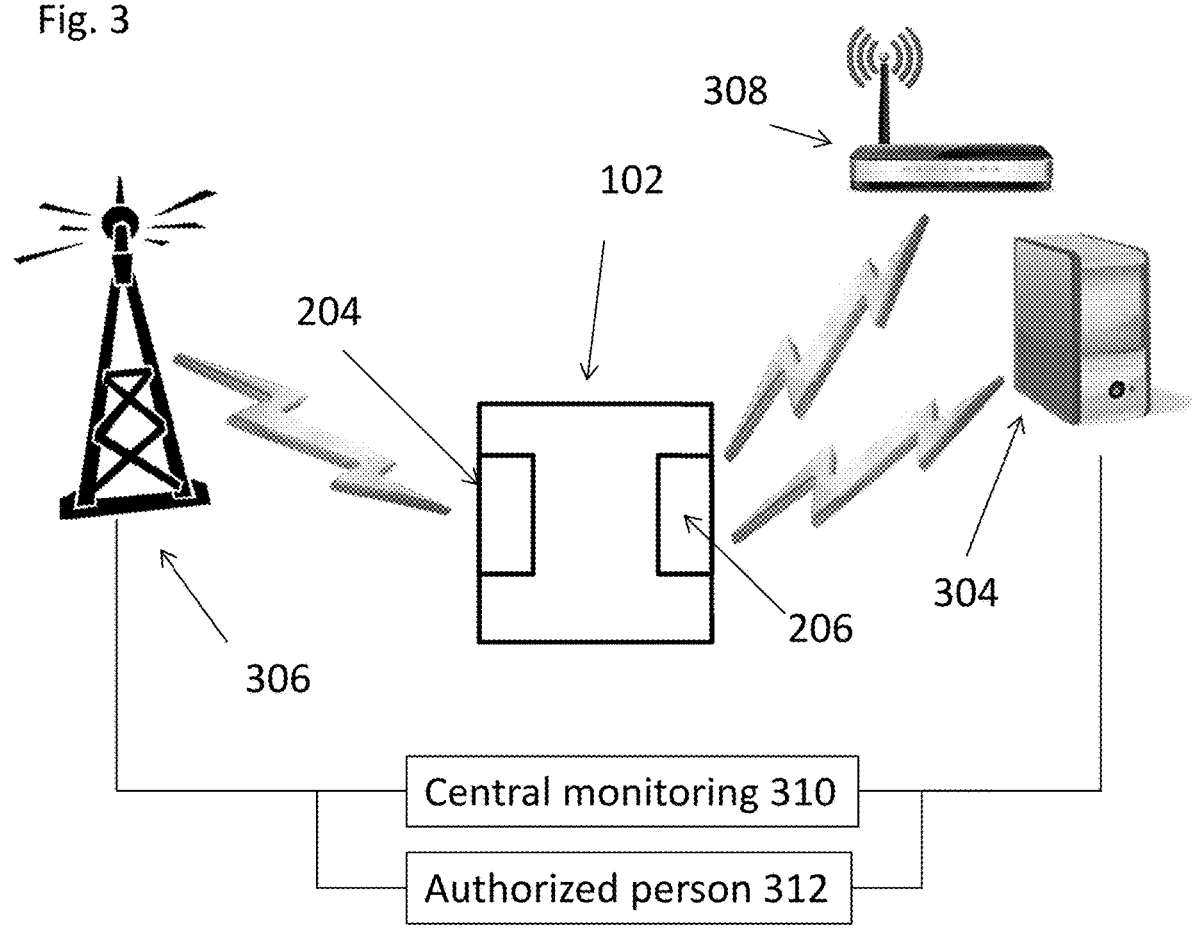
FIG. 3 illustrates an operating environment of the monitoring device of FIG. 1.

Referring now to FIG. 2, a non-limiting example of monitoring device 102 includes a dedicated circuit for determining its location, such as a GPS receiver 202. A modem 204 preferably provided with a SIM card allows the monitoring device 102 to communicate through the cellular network with a central monitoring location 310 (FIG. 3). A short range wireless modem 206 (e.g., 915 MHz or 802.11 compatible Wi-Fi or Bluetooth) allows the monitoring device 102 to communicate locally with other wireless devices within the short range as is known in the art for such devices. Modems 204 and 206 may be the same modem operable to communicate on different frequencies. A substance detector 208 may be provided to monitor the presence of prohibited substances in the monitored individual, such as through a sensor in contact with the skin; the configuration of substance detectors within a portable monitored device are known by those of skill in the art and not further discussed herein. Tamper detection 210 monitors for tamper detection as is known in the art.

Monitoring device 102 may also include a wireless access point detector 220 that detects short range (e.g., maximum range on order of less than hundreds of feet) wireless access points (or "WAP") within range and records information about the detected wireless access points in the memory. By way of non-limiting example, wireless access points may be IEEE 802.11 compatible Wi-Fi hotspots that provide Internet access to network devices as are commonly known in the art of mobile phones and tablets, and the wireless access point detector 220 may be an IEEE 802.11 compatible Wi-Fi finder. In another non-limiting example, devices that communicate via Bluetooth could be wireless access points. A cellular tower is a long range point of access (maximum range on the order of miles) and would not be a short range wireless access point as understood herein.

Batteries, a power port, memory, I/O interface, wired communication access and other supporting computer hardware and software as is known in the art are also preferably provided and not discussed further herein. Monitoring device 102 may be integrated into a single unit or multiple units as is known in the art. The invention is not limited to the details of the architecture of monitoring device 102.

Referring now to FIG. 3, monitoring device 102 is shown in an operating environment. Multiple satellites 302 provide the GPS timestamps that GPS receiver 202 in monitoring device 102 converts into location information. The location information represents the approximate position of the monitoring device 102, and by extension the approximate position for the monitored individual, at a particular time. Monitoring device 102 can transmit that information as location data in near real time, and/or can store the location information as location data in memory and batch transfer collected location data as dictated by the need of the system (e.g., on a fixed and/or random schedule, or in response to an event or specific instruction to do so). If substance detection capability is present, then information relating to screening(s) may be similarly stored, transmitted in near real time or batch transmitted collectively, either with or separately from the location data.

Monitoring device 102 preferably has at least two options for remote communications, including data transfer. The first is through the short range wireless modem 206 with a trusted home monitoring device 304 when within the range (e.g., <300 feet, more particularly about 50-100 feet) of the short range wireless modem 206. The second is through the cell/long range capability of modem 204 (potentially miles) to a cell tower 306 when the monitoring device is out of range of the home monitoring device 304. A third option is short range wireless modem 206 with a wireless access point 308. Preferably cell tower 306, wireless access point 308 and/or home monitoring device 304 connect to central monitoring location 310 and/or an authorized individual 312, whether directly or through intervening equipment (e.g. cell network, Internet) as known in the art.

Wireless access point detector 220 is shown in FIG. 2 as separate from modems 204 and 206, but may be part of those modems or other components. By way of non-limiting example, modem 204 could be a cellular modem, modem 206 could be a separate RF modem, and wireless access point detector 220 could be a distinct Wi-Fi modem and/or Wi-Fi finder component. In yet another example, modem 206 is a Wi-Fi network adaptor that includes Wi-Fi finder hardware and/or software, such that the wireless access point detector 220 is part of modem 206. In still yet another example, modem 204 could be a cellular modem, modem 206 could be a separate RF modem, and wireless access point detector 220 could be a distinct Wi-Fi network adaptor. The invention is not limited to the particular organization or components that define the wireless access point detector 220.

Central monitoring location 310 is "central" in the sense that it serves one or more monitoring devices 102. It may be a single location, multiple locations operating independently, or a distributed arrangement. At a most basic level the central monitoring location 310 is no more than a computer (e.g., a server) having a memory, processor, modem, input/output, and other supporting computer hardware and software as is known in the art, although in practice they may be large facilities with distributed computers and human handlers. Functionality attributed herein to central monitoring location 310 is preferably implemented by software programmed onto electronic computer hardware. The invention is not limited to the architecture or layout of the central monitoring location 310.

Figure 4A:
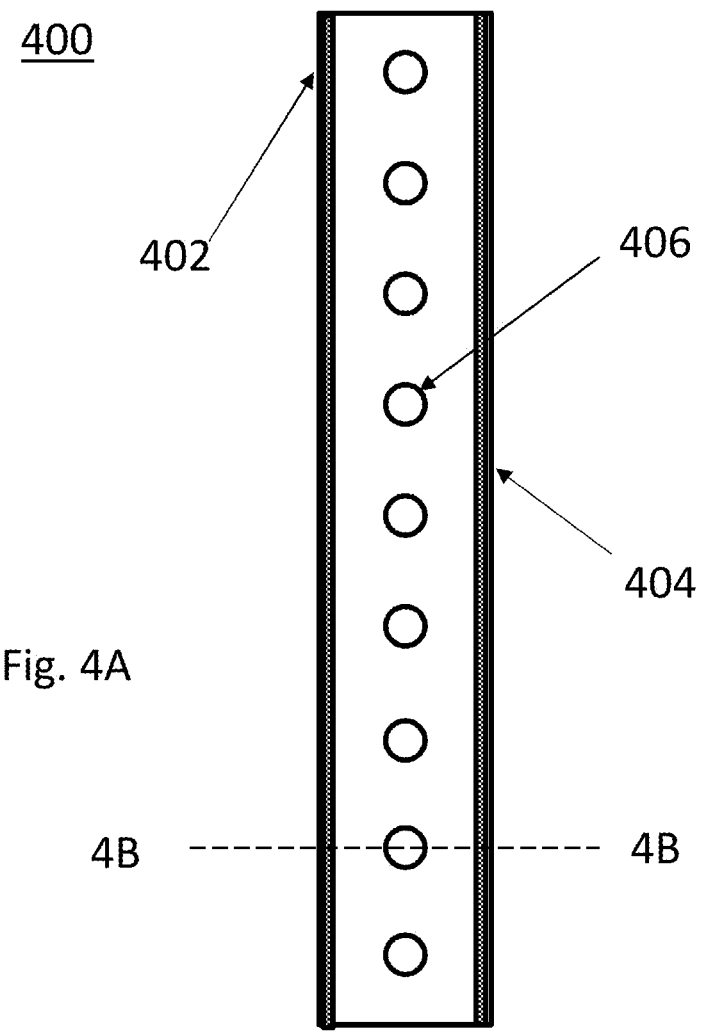
FIGS. 4A and 4B illustrate a band and a cross section thereof according to an embodiment of the invention.
Figure 4B:
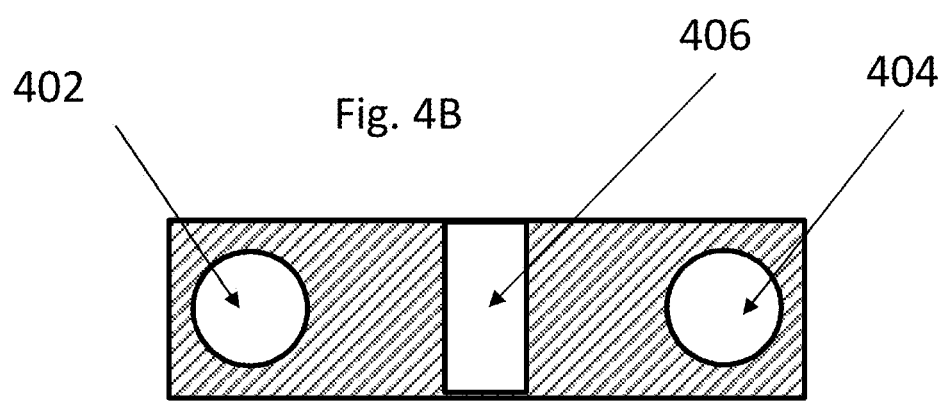

Referring now to FIGS. 4A and 4B, and embodiment of a band 400 for use as band 104 is shown. Band 400 includes a first optical filament 402 and a second optical filament 404 embedded along the length of band 400. Both optical filaments 402 and 404 are shown at the maximum permissible distance from each other, although they may be closer. Placing the optical filaments 402 and 404 further apart from each other makes it less likely that any problem associated with one of the optical filaments would influence the other. Filaments 402 and 404 may be as far apart as possible while still maintaining the minimum desired protective thickness from the side edges of band 400.

Figure 8:
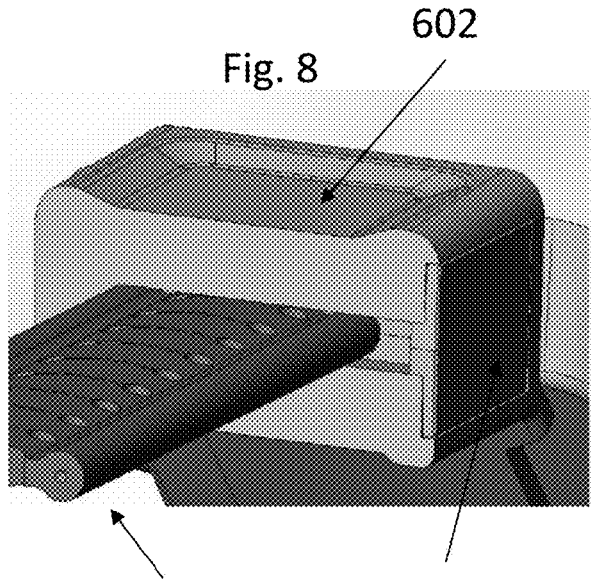

In between the optical filaments 402 and 404 are a series of holes 406. These are used in the physical connection of the band 400 itself to the monitoring device 102 as is known in the art. As shown optical filaments 402 and 404 are further apart than holes 406 such that the connection of monitoring device 102 to band 400 via the holes 406 does not interfere with the transmission of light through optical filaments 402 and 404 and insertion of any connector into any particular hole 406 will not cut into either of the optical filaments. However, the invention is not so limited, and one or both of optical filaments 402 and 404 may overlap onto the openings in the holes 406. The invention is also not limited to single row of holes 406, and multiple rows of holes 406 may be used such as shown in FIG. 8.

Figure 5:
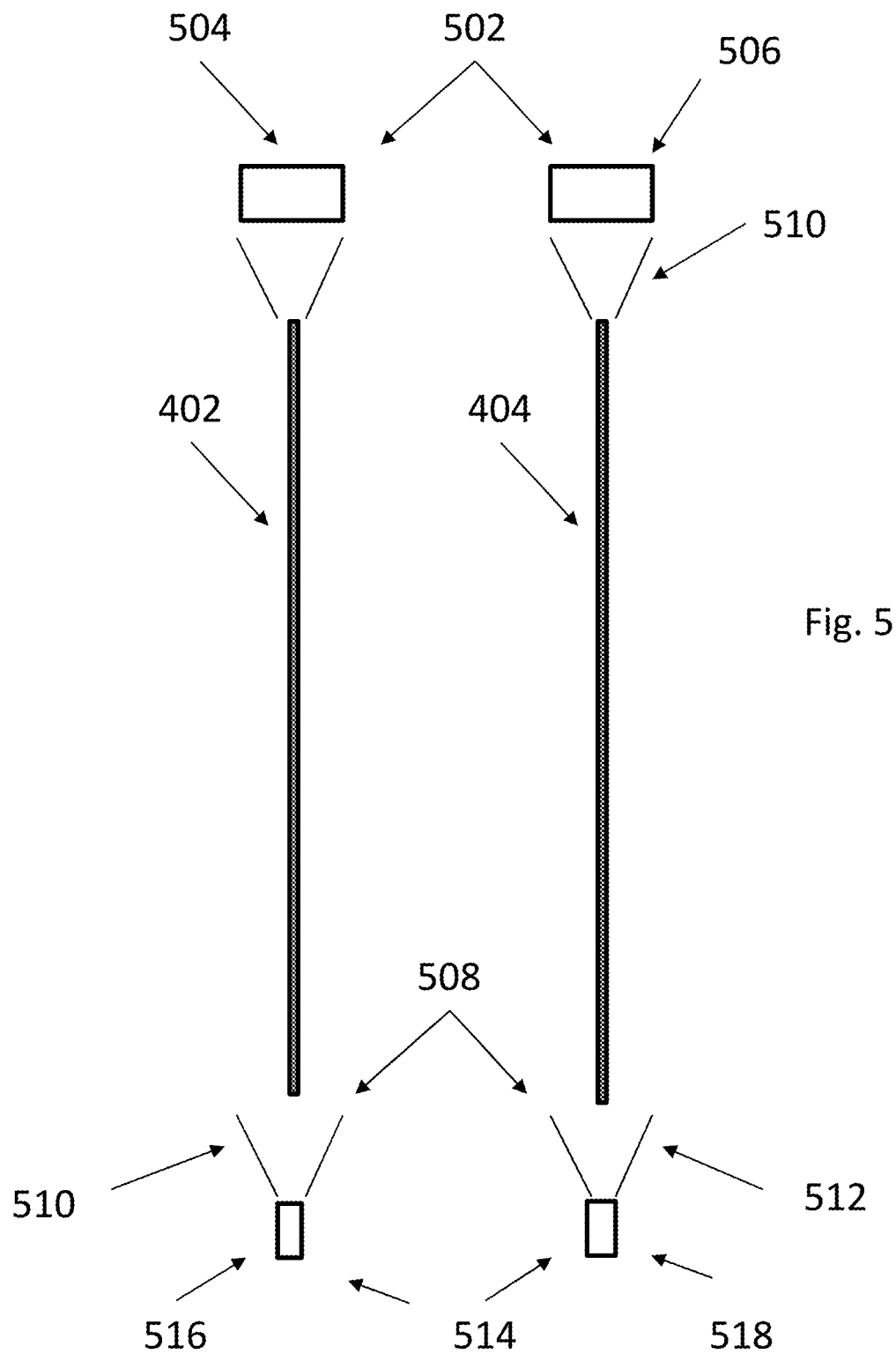
FIG. 5 illustrates a block diagram of an embodiment of light emitters, light receivers and intervening filaments in a monitoring device.

Referring now to FIG. 5, an overview of the tamper detection environment within a band 400 is shown. On one end a light emitter array 502 within monitoring device 102 provides light for each of the optical filaments 402 and 404. In this embodiment each optical filament 402 and 404 has its own corresponding light emitter 504 and 506 (such as an LED) within light emitter array 502, although the invention is not so limited and other numbers of light sources could be provided. By way of non-limiting example, only one light source may be provided to provide light to both optical filaments 402 and 404.

On the other end, funnels 508 within monitoring device 102 collect light exiting from the optical filaments and direct them to light receiving array 514. In this embodiment each of optical filaments 402 and 404 has its own corresponding funnel 510 and 512 and light receiver 516 and 518 (such as photo diode), although the invention is not so limited and other numbers of funnels and/or light receivers could be provided.

Monitoring device 102 may be programmed to activate first and second light emitters 504 and 506 to produce expected light on a particular schedule. By way of non-limiting example, both light emitters 504 and 506 could illuminate at the same time every 10 seconds. In another non-limiting example, each light emitter could alternate and illuminate at 20 second intervals (so that one of the light emitters thus fires every 10 seconds). In another example, one light emitter could illuminate every 10 seconds while the other one illuminates once a minute. In another example, only one "primary" light emitter would illuminate periodically and the other "secondary" light emitter would illuminate as a back-up/check in response to a failure to receive light from the primary light emitter. However, the invention is not so limited, to the nature of the schedule, and indeed there may be no schedule at all if the lights are continuously illuminated.

When operating as intended, light receivers 516 and/or 518 will receive the expected light when scheduled. If expected light is not received when expected, then this is an indication that something is amiss with monitoring device 102. Similarly, if unexpected light is received (on or off schedule) this would also indicate that something is amiss with monitoring device 102. The appropriate components of monitoring device 102 would send a corresponding alert to the central monitoring location 310 and/or authorized person 312 in a manner as is known in the art.

According to an embodiment of the invention, monitoring device 102 may be programmed to issue different levels of alerts based on whether expected light is being received through optical filaments 402 and 404. Light is "expected" if it meets certain predefined characteristics. Non-limiting examples of characteristics including timing (the schedule of when the light is transmitted), light intensity, light frequency, and/or light color. The invention is not limited to the particular predefined characteristics.

Circumstances of highest level concern would be consistent with the absence of expected light through both optical filaments 402 and 404. Non-limiting examples of expected light not being received from both optical filaments 402 and 404 include cutting off of band 400, complete malfunction of monitoring device 102, or other catastrophic damage to monitoring device 102. These circumstances are of highest level concern and may result in monitoring device 102 transmitting an appropriate high threat level signal to the central monitoring location 310 and/or authorized person 312; the response may trigger a near real time dispatch of authorities to investigate. As a high level threat alert, monitoring device 102 may be programmed to send the alert immediately without waiting for the next scheduled upload window of movement data, but the invention is not so limited and the alert may be sent on a different schedule.

Circumstances are of moderate level concern would be consistent with expected light being only received from one of the optical filaments 402 and 404. Non-limiting examples of expected light being received on one but not both optical filaments 402 and 404 include debris in one of the optical pathways, partial tear of band 400, or other moderate malfunction or damage to the monitoring device 102 or band 400 that affects one optical pathway but not the other.

That one optical pathway remains functional ensures that the monitoring device 102 remains operational and attached to the monitored individual, and thus there is no potential imminent threat that requires near real time reporting and/or response. These circumstances are thus long term problematic and require correction/repair, but there is no corresponding short term concern and thus the higher level alert may not be necessary. These circumstances are thus of moderate concern (a concern level less than that the high level concern above) and may result in monitoring device 102 transmitting an appropriate moderate threat level signal to the central monitoring location 310 and/or authorized person 312. Response may come on a non-urgent basis, such as alerting the parole officer for attention the next day or at some other convenient time, or automatically calling the monitored person and instructing them to report in for repair. As a moderate level threat alert, monitoring device 102 may defer sending the alert until the next upload cycle for uploading movement data, but the invention is not so limited and the alert may be sent on a different schedule.

The dual filament nature of band 400 may also be used to react to the presence of unexpected light, which is typically external light that enters through a breach in an optical filament or the housing of monitoring device 102. Non-limiting examples would be ambient sunlight entering a breached optical pathway, or a flashlight intentionally directed into a severed optical filament. The presence of unexpected light on both optical pathways would tend to be consistent with intentional tampering and generate a high level threat alert, whereas the presence of unexpected light on only one of the two optical pathways may be consistent with a lesser issue and thus only result in the moderate level alert. For such cases, the receiver may be expecting expected light from the emitters, or the receiver may be expecting absence of light (i.e., darkness) from the emitters.

In the above embodiments, no specific light pathway is more or less important than the other, in that expected or unexpected light is received on none, one, or both. However, the invention is not so limited, and the presence or absence of light on one particular optical pathway may have a different meaning or importance than the other optical pathway.

By way of non-limiting example, the architecture of a particular monitoring device may place one of the optical filaments, such as optical filament 402 for example, closer to an exterior point of access. In that case, tampering such as attempting to breach the housing would more likely occur closer to optical filament 402 than to optical filament 404. External light being received by receiver aligned with optical filament 402 may therefore be more indicative of a tampering attempt than if external light is received at a receiver aligned with optical filament 404. Different levels of response and/or issued alert may occur in response to external light along one optical pathway as compared with the other.

The discussion above of high and moderate level alerts is exemplary only, and the invention is not limited thereto, and "high" and "moderate" are meant to illustrate relative importance of the alerts as compared to any absolutes or other types of alerts. The system may be programmed with any number of different alerts, both in content and/or severity, to react to different states of detected light as may be appropriate.

Light emitter array 502 will be ON or OFF based upon instructions from the processor and/or tamper detection 210. In at least one embodiment, light emitter array 502 may illuminate light emitters 504 and 506 the same way (ON/ON or OFF/OFF). In another embodiment, light emitter array 502 may illuminate light emitters 504 and 506 the same way (ON/ON or OFF/OFF) or differently (ON/OFF or OFF/ON). In another embodiment, light emitter array 502 may illuminate light emitters 504 and 506 differently (ON/OFF or OFF/ON). The amount of corresponding expected light received by light receiving array 514 will be evaluated by processor and/or tamper detection 210 to identify compliance with, or deviation, from predetermined norms.

Below follows non-limiting examples of different possible light emissions and corresponding light reception, along with possible reactions to each.

When light emitter array 502 is OFF, no light is expected to be received by light receiving array 514. Thus the absence of received light would be consistent with normal operation; this state may not trigger any specific reaction by the system other than perhaps a log entry of this expected state.

When light emitter array 502 is completely ON, light is expected to be received by both light receivers 516 and 518 in light receiving array 514. Thus the presence of received light by both receivers would be consistent with normal expected operation; this state may not trigger any specific reaction by the system other than perhaps a log entry of this expected state.

In contrast, the absence of expected light on both optical pathways would be consistent with significant tampering or malfunction. The corresponding scenarios includes cut and run, and thus may trigger the highest level alert which may be transmitted in real time relative to the event.

If expected light is received by one of light receiver 516 or 518 but not the other, this would indicate the presence of tampering, damage or malfunction to the monitoring device. However, since expected light is received on one optical pathway, the circumstances are not consistent with a cut of the entire band 400 or other catastrophic comparable loss of tracking. These circumstances may trigger a moderate level threat alert as discussed above.

As noted above, light emitter array 502 may vary which optical filaments are illuminated at any given time. If only one optical filament is illuminated and expected light is not received, then in response to that failure monitoring device 102 may illuminate the other optical fiber (illumination of the original optical fiber may continue or be shut off during this subsequent illumination); expected light from this subsequent illumination will either be received or not. If no light is received from the second illumination then both optical pathways are inoperative and may generate a high level alert as discussed above. If expected light is received from the second illumination, then only one optical pathway is inoperative and may generate a moderate level alert as described above. In combination the two separate illumination steps and corresponding light reception or lack thereof would reveal if both optical pathways are inoperative or if only one pathway is inoperative.

Figure 6:
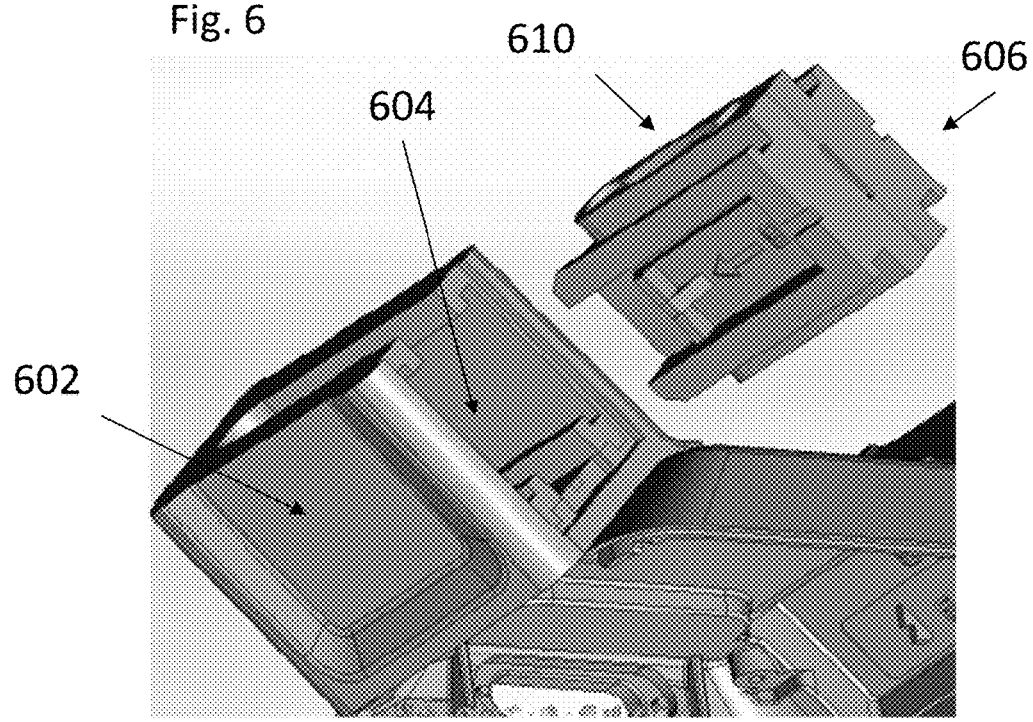
FIGS. 6-8 are perspective views of a monitoring device, band and clip in various states of assembly.
Figure 7:
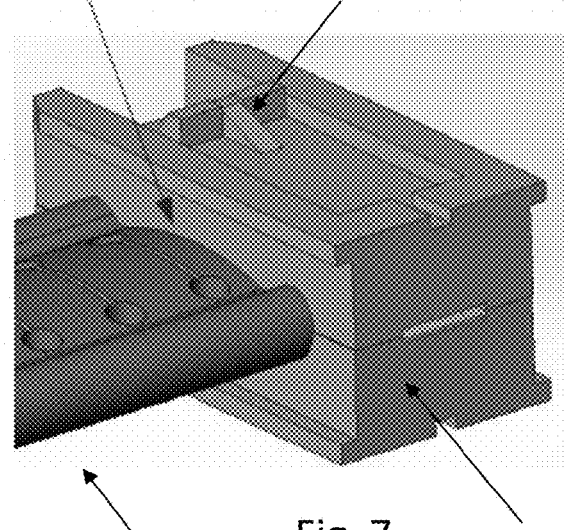

Referring now to FIGS. 6-8, an embodiment for attaching a band 400 to a monitoring device 102 is shown. An end of monitoring device 102 has a receiving end 602 for connecting to a band 400. Only one receiving end 602 is shown, although another one would be present on the other side of monitoring device 102 to receive the other end of band 400. The two receiving ends 602 are preferably symmetrical, although the invention is not so limited and different shapes could be used.

Receiving end 602 has an interior cavity 604 with an opening to receive a clip 606. Given the orientation on an ankle, the opening would either face upward toward the knee, or downward toward the heel.

Interior cavity 604 and clip 606 may have various shapes, protrusion and grooves to facilitate smooth insertion of clip 606 into interior cavity 604. A locking mechanism, such as click protrusion 612 on the outwardly facing surface of either one of the clamshells and corresponding groove or protrusion (not shown) in interior cavity 604 locks the clip 606 in place when inserted therein. The lock may be permanent (not separable absent destructive force) or releasable (lockable and unlockable with a key or other appropriate tools that permit reuse and reinsertion).

Prior to insertion, an end of band 400 is secured into clip 606 and emerges from an edge 608 of clip 606. FIG. 7 shows band 400 mounted in clip 606 before insertion. FIG. 8 shows clip 606 with mounted band 400 securely inserted into receiving end 602. When band 400 is in clip 606 and inserted into interior cavity 604 there is no path for exterior light to enter monitoring device 102, such that if any light does enter and is received by light receiver array 514 the system would attribute that light to be in response to tampering, damage and/or malfunction as discussed above.

While FIGS. 6-8 show different positions of clip 606, the clips themselves are in fact different embodiments with different possible shapes. In FIG. 7 the clip has an overall rectangular shape with ledges at the top and bottom. FIG. 6 is similar to FIG. 7 save that the clip has bulges 610 along the center where the band 400 connects. FIG. 8 has a more rectangular top. These are non-limiting examples of variations on the shape, and the invention is not limited thereto.

Figure 9A:
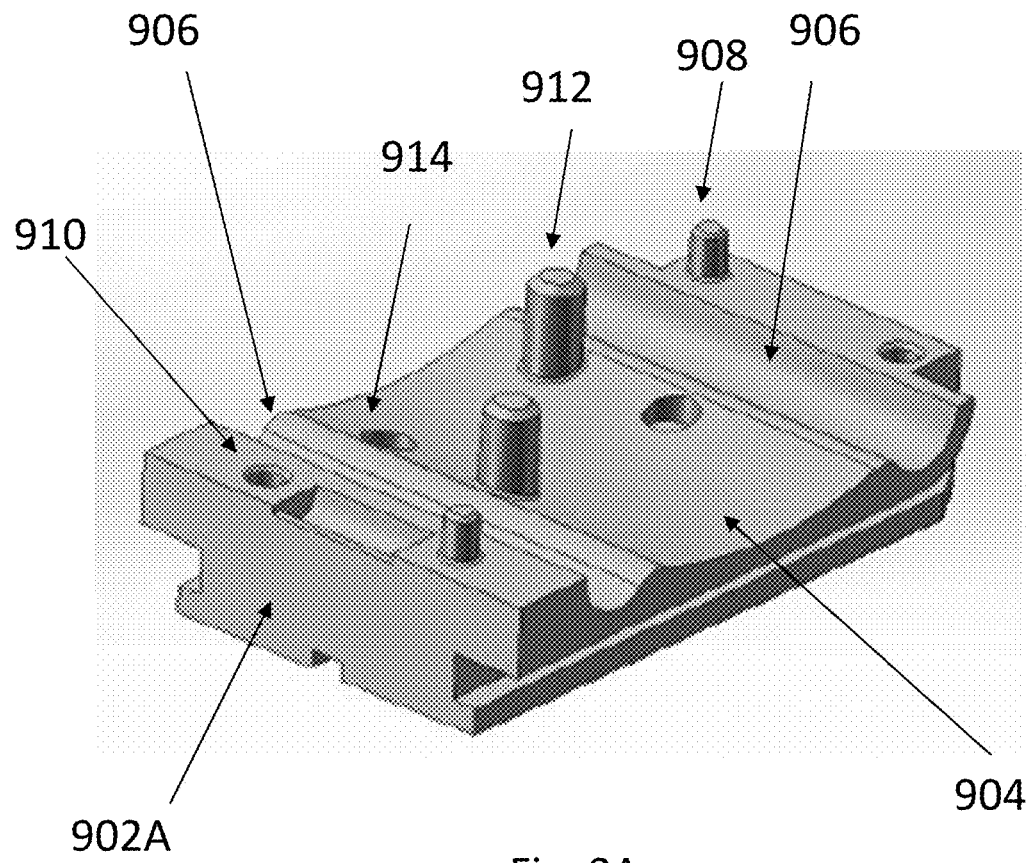
FIGS. 9A and 9B are perspective views of clip components according to an embodiment of the invention.
Figure 9B:
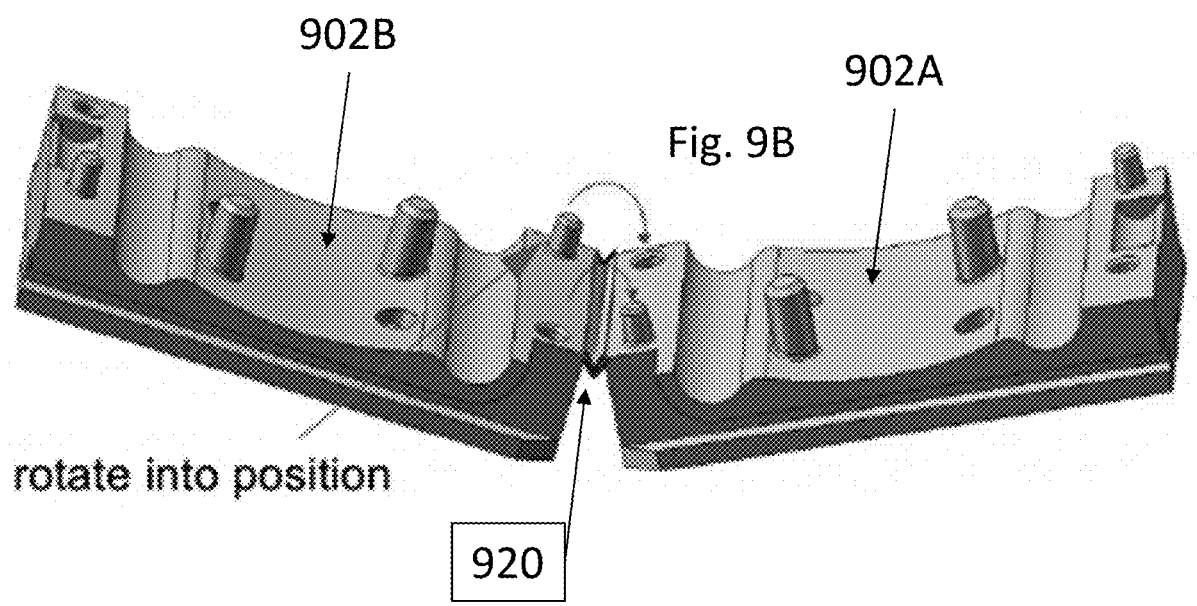

Clip 606 may include two mating clamshells surrounding the band 400. Referring now to FIGS. 9A and 9B, a clamshell 902A is shown, and would mate with a symmetrical clamshell 902B to form clip 606. Grooves 906 on an inward facing surface of the clamshells accommodate the portion of the band 400 with optical filaments 402 and 404. Protrusions 908 are outside of the path of band 400 and mate with corresponding grooves 910 to align the two clamshells. Protrusions 912 are inside the path of band 400 and mate with corresponding grooves 914 to engage with holes 406 in band 400 and to further align the two clamshells. Clamshells 902A and 902B may be connected by a hinge 920 so they rotate into position, although the invention is not so limited and the clamshells may be unconnected components.

When connected together, the protrusions 912 thought the holes 406 lock the band 400 to clip 606. Subsequent locking of clip 606 into receiving end 602 locks the band 400 to the monitoring device 102.

If band 400 was forcefully removed from the configuration of FIGS. 9A and 9B, then the grooves 906 would channel exterior light into monitoring device 102, where it would be detected by light array 514 as unexpected light. The system could react with an appropriate alert as discussed above.

As seen in FIG. 8, the exposed top of clip 606 presents a potential point of tampering, and in particular someone may attempt to jamb a screwdriver or similar tool in and around clip 606. This represents a scenario in which unexpected light received on one light receiver may have a different meaning than if received at other light receiver, as light from this tampering may only reach a portion of light receiver array 514 closer to one side of band 400 than the other. For example in the orientation of FIG. 8, light from such tampering would tend to reach the light receiver aligned with the rightmost optical filament of band 400, but may not reach the light receiver aligned with the leftmost optical filament of band 400. In contrast, it would be difficult in the architecture to receive unexpected light at the leftmost light receiver but not the rightmost, and if such circumstances were present it may be more consistent with a malfunction than tampering and thus generate a lesser alert. However, if the rightmost light receiver is receiving external light but the leftmost is not, then tampering with clip 606 is within the realm of possibilities and may generate a relatively higher level threat alert.

In some combinations, clip 606 and receiving end 602 may have a variety of shapes to accommodate band 400, such shapes providing certain advantages and disadvantages from a manufacturing and/or assembly perspective.

Figure 10:
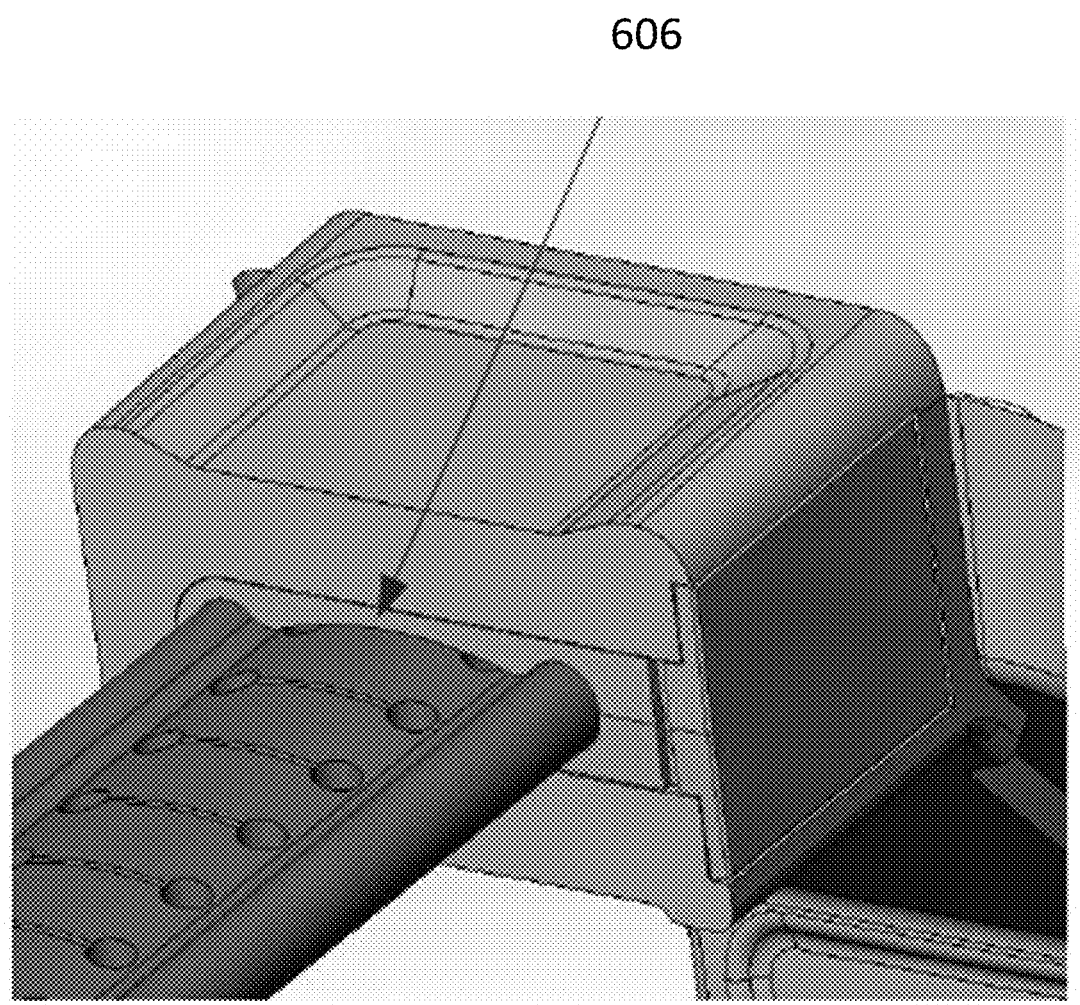
FIGS. 10-14 show different embodiments of clip shapes.

In the embodiment of FIG. 10, clip 606 completely encompasses band 400, the outer edge 608 of clip 606 is flush with the edge of receiving end 602, and the edge of receiving end 602 has a simple shape to accommodate clip 606.

Figure 11:
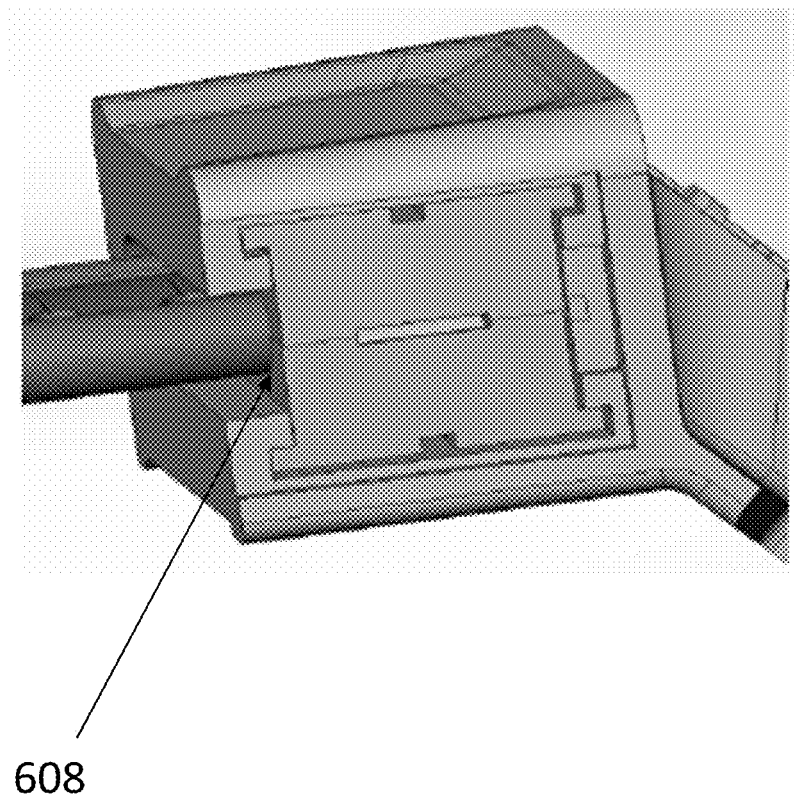

The embodiment of FIG. 11 is similar, save that the edge 608 of clip is recessed inward from the edge of receiving end 602. Compared to the embodiment of FIG. 10, this design uses less material for clip 606, but is less aesthetically pleasing.

Figure 12:
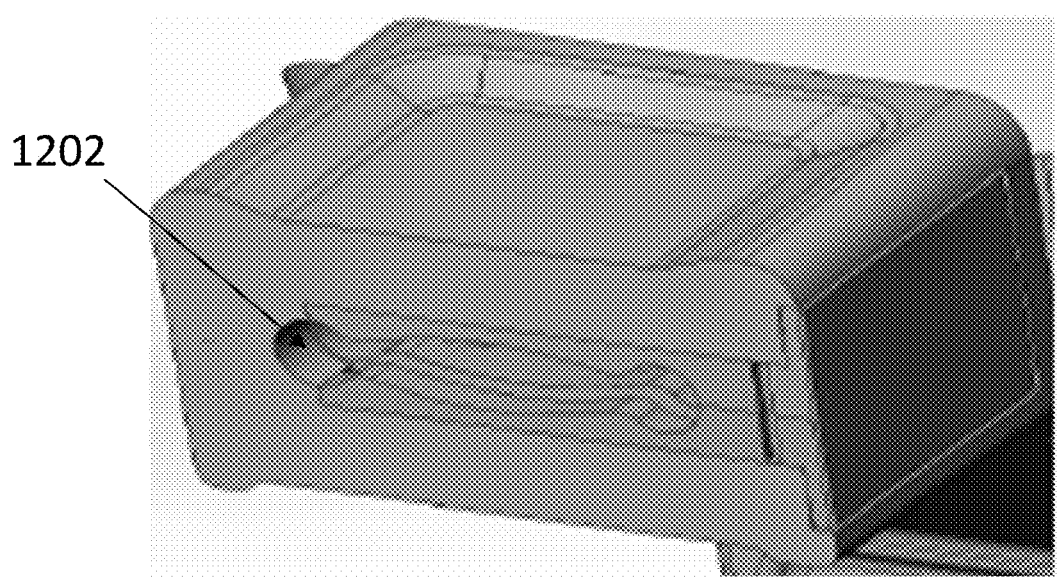

In the embodiment of FIG. 12, clip 606 does not cover all of band 400, and for which receiving end 602 has a portion 1202 that at least partially matches the shape of band 400. In this embodiment clip 606 and receiving end 602 combine to surround band 400.

Figure 13:
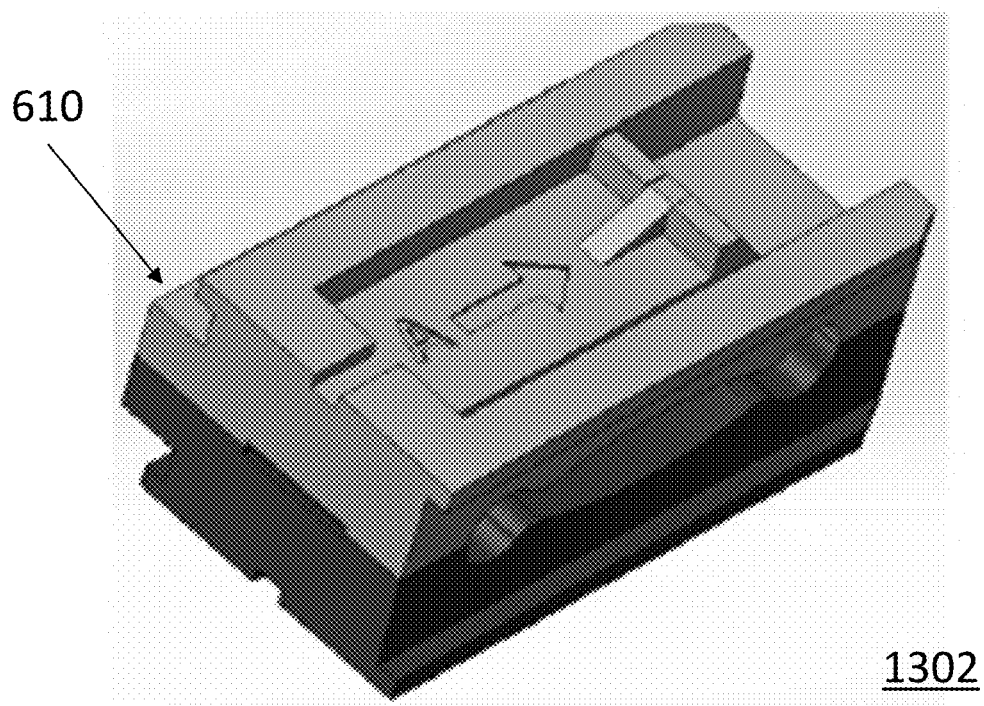

The above designs as shown are symmetrical, but need not be the case. For example, a clip 1302 as shown in FIG. 13 has one side with the bulge 610 of FIG. 6 and the other side lacks the bulge as in FIG. 7. Such an asymmetrical design may reduce orientation confusion during insertion to the clip.

Figure 14:
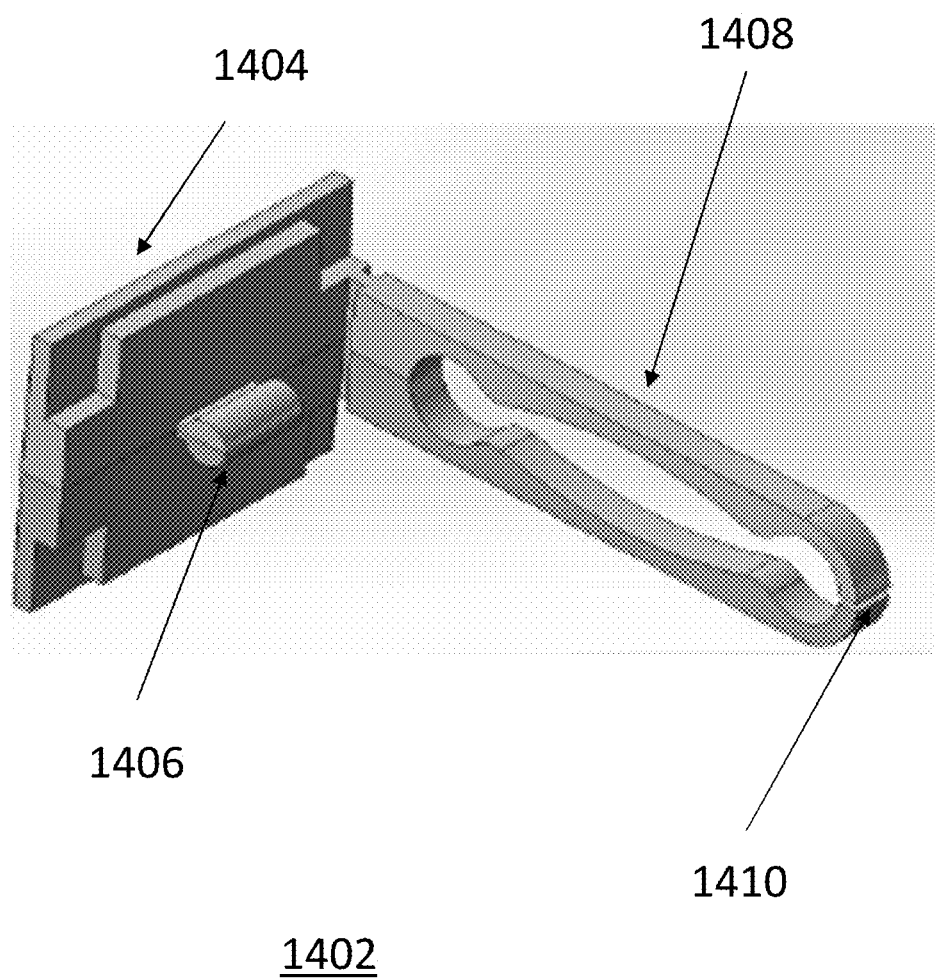

Referring now to FIG. 14, another embodiment of clip 1400 is shown. Unlike the embodiments of FIGS. 6-13, clip 1402 has an overall L-shape defined by a top cap 1404 and a band clip 1408. The interior of top cap 1404 has a projection 1406 that can act as part of a locking mechanism as discussed above. The band clip 1408 is shaped to surround band 400 when inserted. The top and bottom of band clip 1408 are connected to cap 1404 on one end, but not connected at the other end (shown by 1410, which may be a small gap or simply the two separate components pressing against each other). This shape acts as a spring so the top and bottom portions can slightly separate to accommodate insertion of band 400, and then are clamped into place via engagement pressure from insertion into receiving end 602.

Figure 15:
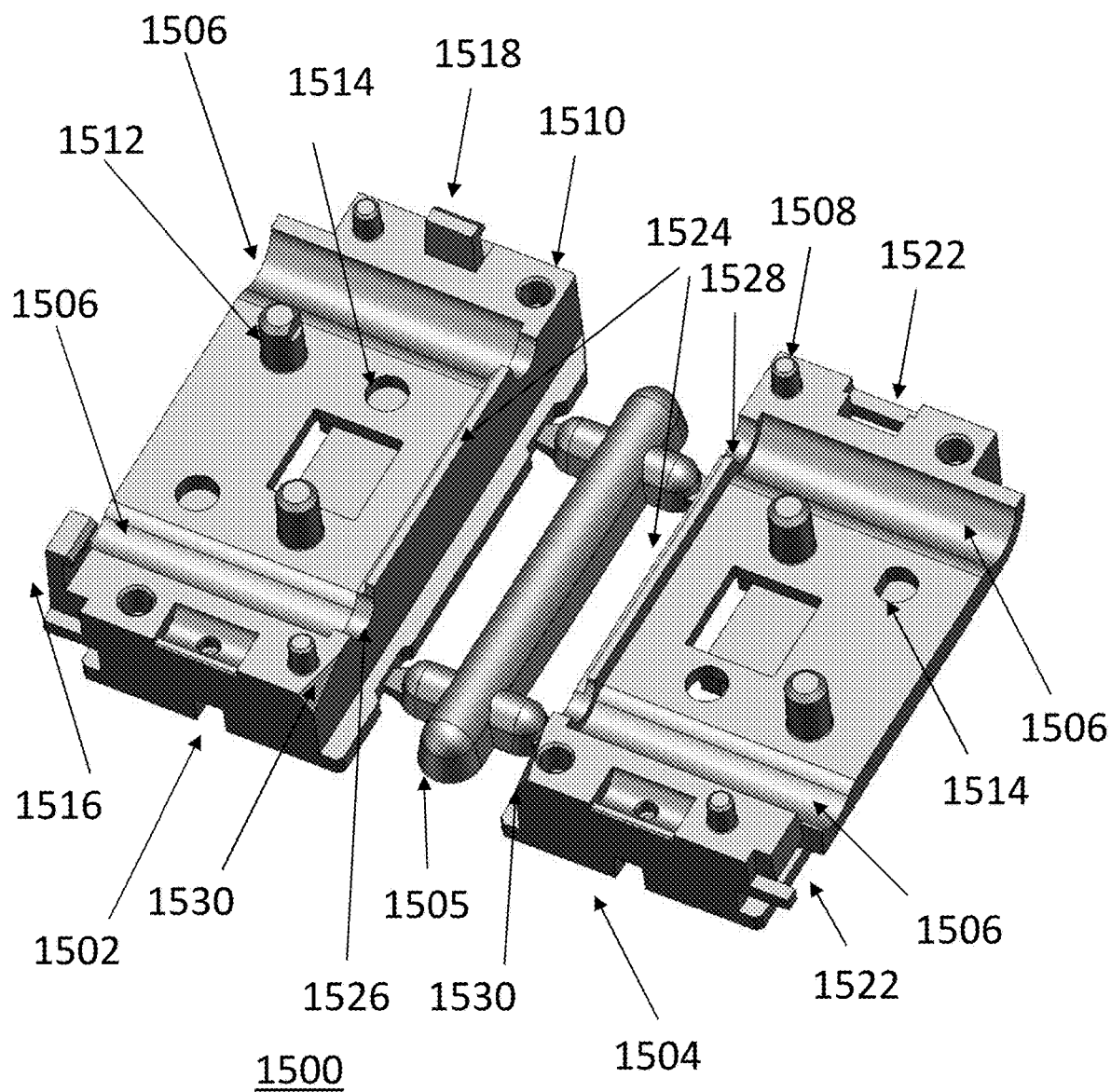
FIG. 15-18 show another embodiment of a clip relative to a personal monitoring device.
Figure 16:
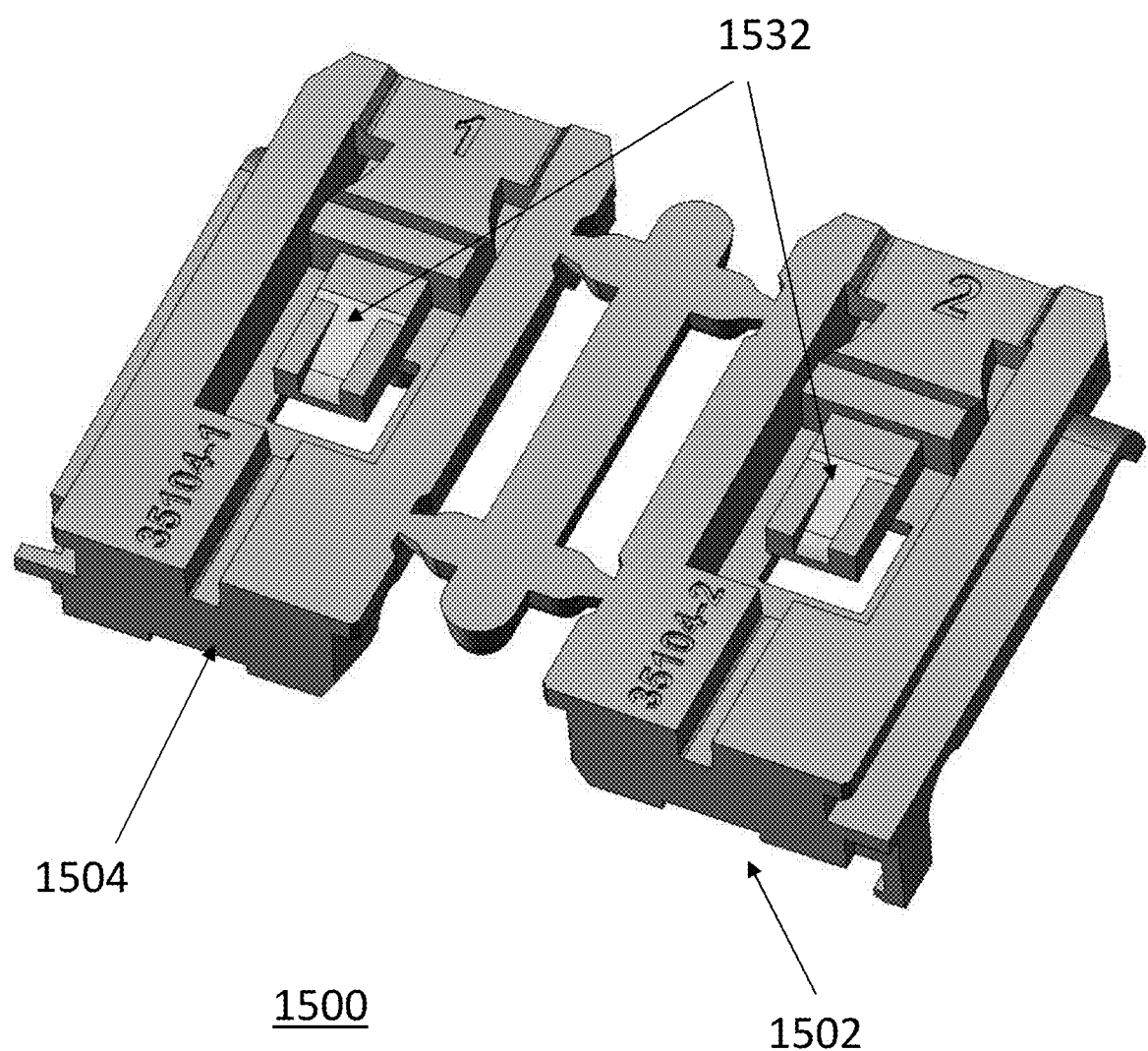

Referring now to FIGS. 15 and 16, another embodiment of a clip 1500 is shown. Clip 1500 includes two mating clamshells 1502 and 1504 that can surround band 400 in the manner described in the prior embodiments. Clamshells 1502 and 1504 may be commonly molded with a connecting frame 1505 that can be removed, but the invention is not limited to any particular manufacturing methodology.

The inwardly facing surfaces of clamshells 1502 and 1504 have grooves 1506 that accommodate the portion of the band 400 with optical filaments 402 and 404. Protrusions 1508 are outside of the path of band 400 and mate with corresponding grooves 1510 to align the two clamshells 1502 and 1504. Protrusions 1512 are inside the path of band 400 and mate with corresponding grooves 1514. Protrusions 1512 will engage holes 406 in band 400 to secure band 400 into clip 1500.

Each clamshell 1502 and 1504 may include one or more sets of latches and mating flanges to lock the clamshells in place. In the embodiment of clip 1500, clamshell 1502 includes a first latch 1516 and a second latch 1518 that connect with flanges 1520 and 1522, respectively. Latch 1516 extends perpendicular to the length of band 400 while latch 1518 extends in parallel with the length of band 400, but other configurations may be used.

Two mating sides of clamshells 1502 and 1504 have raised walls 1524, which when mated act as an interior stopper for insertion of band 400. Grooves 1526 and 1528 on lateral sides of the raised walls allow light from the fiber optic filaments of band 400 to pass light into the internal light receiving array 514 as discussed above.

Clamshells 1502 and 1504 have beveled corner edges 1530. As discussed above when respect to other embodiments, when clip 1500 is installed it blocks light from reaching the internal light receiving array 514. Beveled corner edges 1530 act as a funnel that funnel light toward that internal light detecting circuitry, such that if someone tampers to create a space between clamshells 1502 and 1504, the additional light access as funneled from beveled edges 1530 will make it easier to detect the tampering.

A locking mechanism, such as click protrusion 1532 on the outwardly facing surface of either one of the clamshells 1502/1504 and corresponding groove or protrusion in interior cavity 604 locks the clip 1500 in place when inserted therein.

Figure 17:
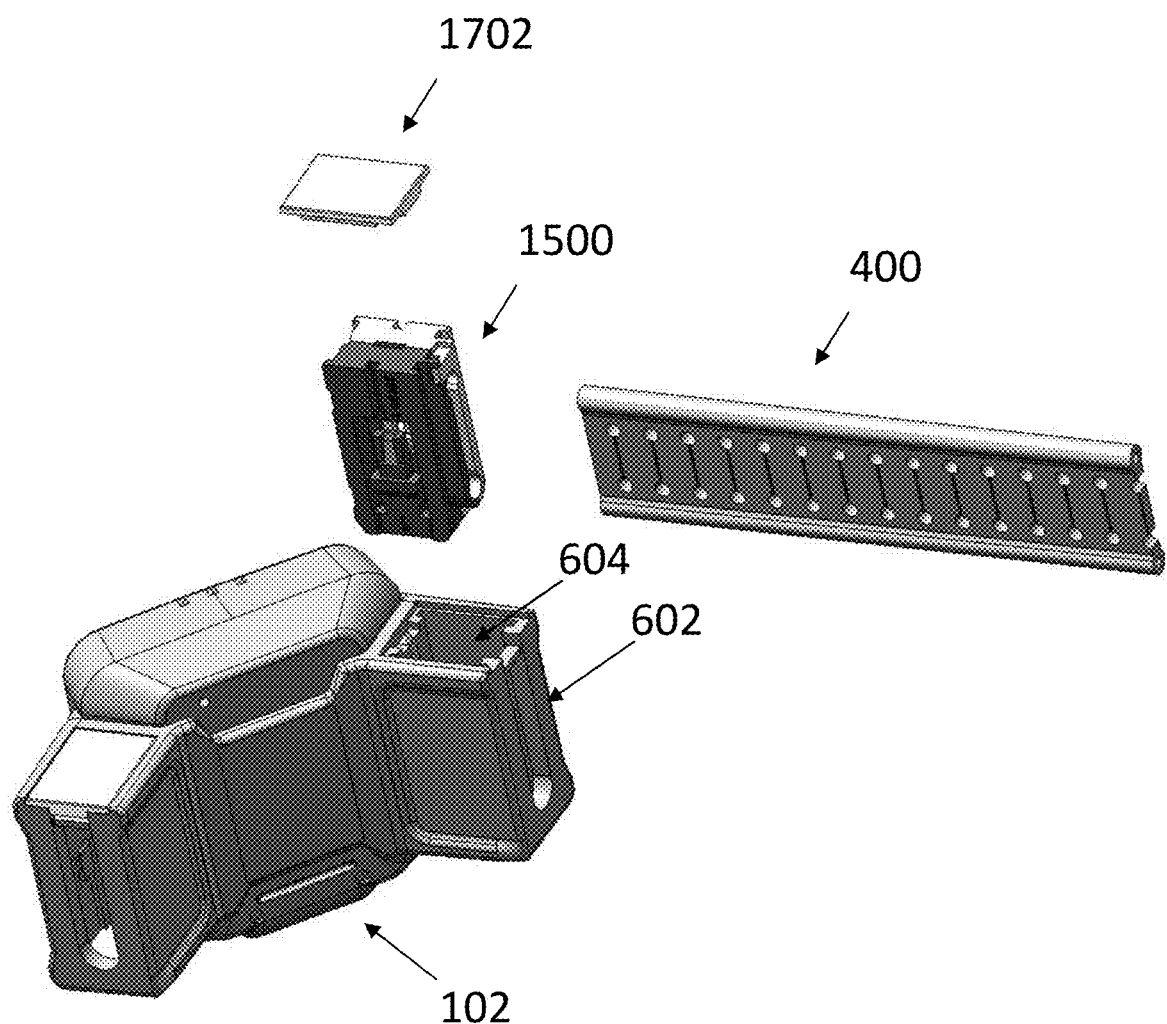
Figure 18:
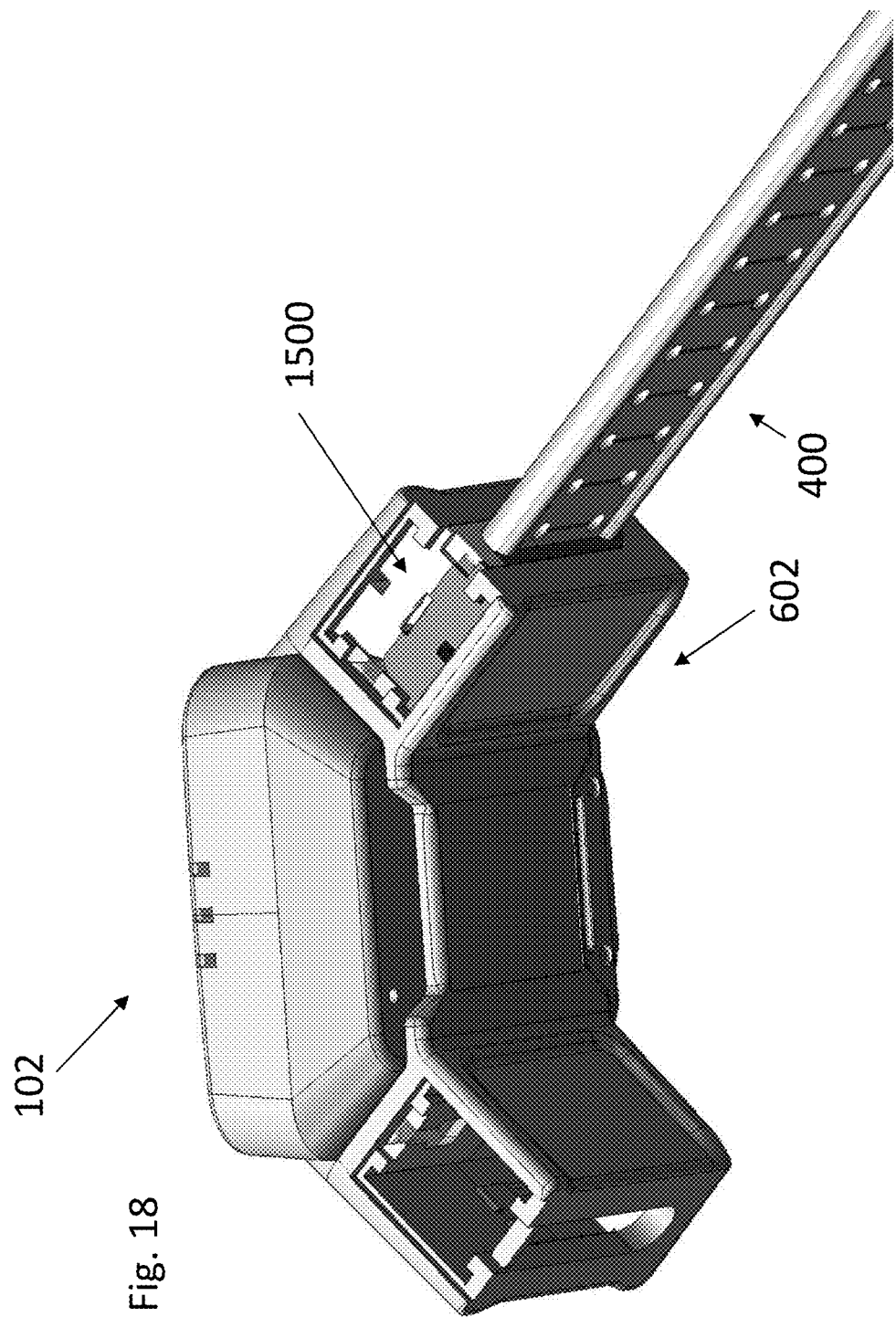

Referring now to FIGS. 17 and 18, clip 1500 is shown relative to monitoring device 102 and band 400. The end of band 400 aligns with the walls 1524, such that holes 406 align with protrusions 1512. Clamshells 1502 and 1504 are snapped onto band 400, forming a light blocking component. The combination is inserted into cavity 604 of receiving end 602 of monitoring device 102, and locks in place via engagement of click protrusion 1532 and a mating groove/protrusion within cavity 604. A cover 1702 can be added to cover clip 1500 inside of cavity 400.

Various embodiments discussed or suggested herein can be implemented in a wide variety of operating environments, which in some cases can include one or more user computers, computing devices, or processing devices which can be used to operate any of a number of applications. User or client devices can include any of a number of general purpose individual computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments where the computing device includes a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, an individual of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A clip configured to lockably connect a band to a connector having light detection circuitry, the band having a fiber optic filament embedded therein and at least one hole, the clip comprising:
   first and second shells shaped to mate around the band;
   an inward facing surface of the first shell having:
      a lateral groove shaped to accommodate the fiber optic filament of the band;
      at least one protrusion, wherein when the first and second shells are mated around the band the at least one protrusion passes through one of the holes in the band and engages a matching groove in an inward facing surface of the second shell;
   the first and second shells having a shape such that, when the first shell and the second shell mate around the band and lock into the connector, the first shell and the second shell collectively block any exterior light from reaching the light detection circuitry of the connector along a path of the band other than light through the fiber optic filament.

2. The clip of claim 1, further comprising:
   an outwardly facing surface of the first shell or the second shell having a depressible flange configured to engage with the connector;
   wherein when the first and second shells mate and insert into the connector, the depressible flange locks the first and second shells into the connector.

3. The clip of claim 1, wherein the fiber optic filament of the band comprises first and second fiber optic filaments, and the lateral groove of the clip comprises first and second lateral grooves shaped to accommodate the first and second fiber optic filaments of the band.

4. The clip of claim 3, wherein the at least one protrusion is located between the first and second lateral grooves.

5. The clip of claim 3, further comprising a third lateral groove between the first and second lateral grooves, the third lateral groove being shaped to accommodate a portion of the band between the first and second fiber optic filaments.

6. The clip of claim 1, further comprising the first and second shells are attached by a hinge.

7. The clip of claim 1, wherein the inward facing surface of the first shell is identical to the inward facing surface of the second shell.

8. A clip configured to lockably connect a band to a connector having light detection circuitry, the band having first and second fiber optics filament embedded therein and a plurality of holes between the first and second fiber optic filaments, the clip comprising:
  first and second shells shaped to mate around the band;
  an inward facing surface of the first shell having:
    first and second lateral grooves shaped to accommodate the first and second fiber optic filaments of the band, respectively,
    at least one protrusion between the first and second lateral grooves, wherein when the first and second shells are mated around the band the at least one protrusion passes through one of the holes in the band and engages a matching groove in an inward facing surface of the second shell;
  the first and second shells having a shape such that, when the first shell and the second shell mate around the band and lock into the connector, the first shell and the second shell collectively block any exterior light from reaching the light detection circuitry of the connector along a path of the band other than light through the first and second fiber optic filaments.

9. The clip of claim 8, further comprising:
an outwardly facing surface of the first shell or the second shell having a depressible flange configured to engage with the connector;
wherein when the first and second shells mate and insert into the connector, the depressible flange locks the first and second shells into the connector.

10. The clip of claim 8, wherein the plurality of holes comprises a plurality of pairs of holes extending perpendicular to a length of the band, the at least one protrusion comprising first and protrusions that engage two of the holes.

11. The clip of claim 10, wherein the first and second protrusions are positioned to each engage a hole of a different one of the pair of holes.

12. The clip of claim 8, further comprising a third lateral groove between the first and second lateral grooves, the third lateral groove being shaped to accommodate a portion of the band between the first and second fiber optic filaments.

13. The clip of claim 8, further comprising the first and second shells are attached by a hinge.

14. The clip of claim 1, wherein the inward facing surface of the first shell is identical to the inward facing surface of the second shell.

15. A system, comprising:
a connector having light detection circuitry;
a band having a fiber optic filament embedded therein and a plurality of holes;
a clip shaped to connect the band to the connector, the clip comprising:
  first and second shells shaped to mate around the band;
  an inward facing surface of the first shell having:
    a lateral groove shaped to accommodate the fiber optic filament of the band;
    at least one protrusion, wherein when the first and second shells are mated around the band the at least one protrusion passes through one of the holes in the band and engages a matching groove in an inward facing surface of the second shell;
  the first and second shells having a shape such that, when the first shell and the second shell mate around the band and lock into the connector, the first shell and the second shell collectively block any exterior light from reaching the light detection circuitry of the connector along a path of the band other than light through the fiber optic filament.

16. The system of claim 15, further comprising:
an outwardly facing surface of the first shell or the second shell having a depressible flange configured to engage with the connector;
wherein when the first and second shells mate and insert into the connector, the depressible flange locks the first and second shells into the connector.

17. The system of claim 15, wherein the plurality of holes comprises a plurality of pairs of holes extending perpendicular to a length of the band, the at least one protrusion comprising first and protrusions that engage two of the holes.

18. The system of claim 17, wherein the first and second protrusions are positioned to each engage a hole of a different one of the pair of holes.

19. The system of claim 15, further comprising a central groove shaped to accommodate a portion of the band between the first and second fiber optic filaments.

20. The system of claim 15, further comprising the first and second shells are attached by a hinge.

* * * * *